W. Chapman.
Inodorous Portable Water Closet.
117045        Patented Jul 18 1871
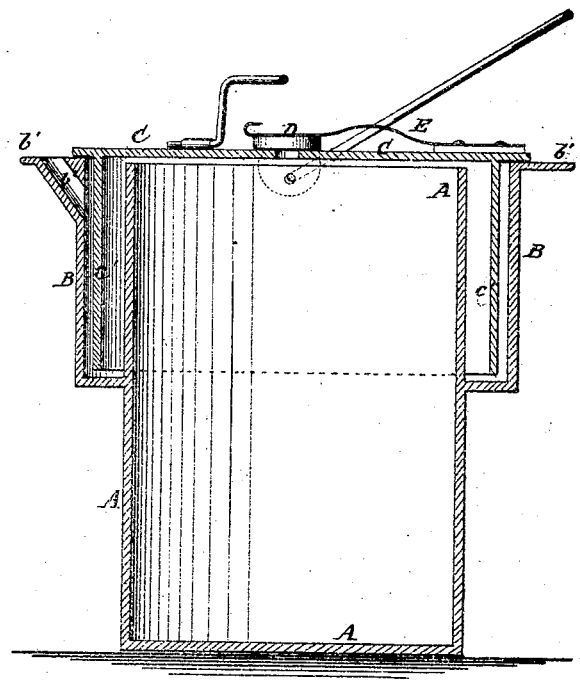
Witnesses:
A. W. Almqvist
Wm. H. C. Smith
Inventor:
W. Chapman
Per Munn & Co
Attorneys.

UNITED STATES PATENT OFFICE.

WILLIAM CHAPMAN, OF MOUNT VERNON, NEW YORK.

IMPROVEMENT IN PORTABLE WATER-CLOSETS.

Specification forming part of Letters Patent No. 117,045, dated July 18, 1871.

*To all whom it may concern:*

Be it known that I, WILLIAM CHAPMAN, of Mount Vernon, in the county of Westchester and State of New York, have invented a new and useful Improvement in Inodorous Portable Water-Closet; and I do hereby declare that the following is a full, clear, and exact description thereof, which will enable others skilled in the art to make and use the same, reference being had to the accompanying drawing forming part of this specification, in which the figure is a detail vertical section of my improved device illustrating the invention.

My invention has for its object to furnish an improved portable water-closet or chamber-vessel, which shall be simple in construction and at the same time so constructed as to surely and entirely prevent the escape of any offensive odors from the contents of said vessel into the room until it may be convenient to empty it; and it consists in the construction and combination of the various parts of the device, as hereinafter more fully described.

A is the body of the vessel, the upper part or the whole of which is made with a second or double wall, B, thus forming a deep channel or cavity around said body. The outer wall B is formed with a flange, $b^1$, around its upper edge, to serve as a seat when the vessel is being used. In the flange $b^1$ is formed a hole, $b^2$, leading into the cavity between the walls A B, for convenience in pouring water into said cavities. C is the cover, which is formed with a deep flange, $c'$, upon its lower side, to enter the space between the walls A B, thus forming a water-joint, hermetically closing the vessel, and entirely preventing the escape of any odor. In the cover C is formed a hole, closed with a valve, D, which valve is held down by a spring, E, of sufficient strength to hold the said valve securely in place. The vessel and cover are each provided with a handle for convenience in handling them.

By this construction, when the cover C is put on the air in said cover raises the valve D and escapes so that it may not be compressed and force the water out of the space between the double walls A B of the vessel. When the cover C is to be removed the valve D is raised a little to allow air to pass in to supply the vacuum which would otherwise be formed, and which would cause a disturbance of the contents of the vessel.

Having thus described my invention, I claim as new and desire to secure by Letters Patent—

The combination of the cover C provided with a deep flange, $c'$, and a spring-valve, D E, with the vessel A B, made in whole or in part with double walls, substantially as herein shown and described, and for the purpose set forth.

The above specification of my invention signed by me this 19th day of April, 1871.

WILLIAM CHAPMAN.

Witnesses:
JAMES T. GRAHAM,
GEO. W. MABEE.